(No Model.)
J. N. JEMISON.
TRUCK.
No. 540,317. Patented June 4, 1895.
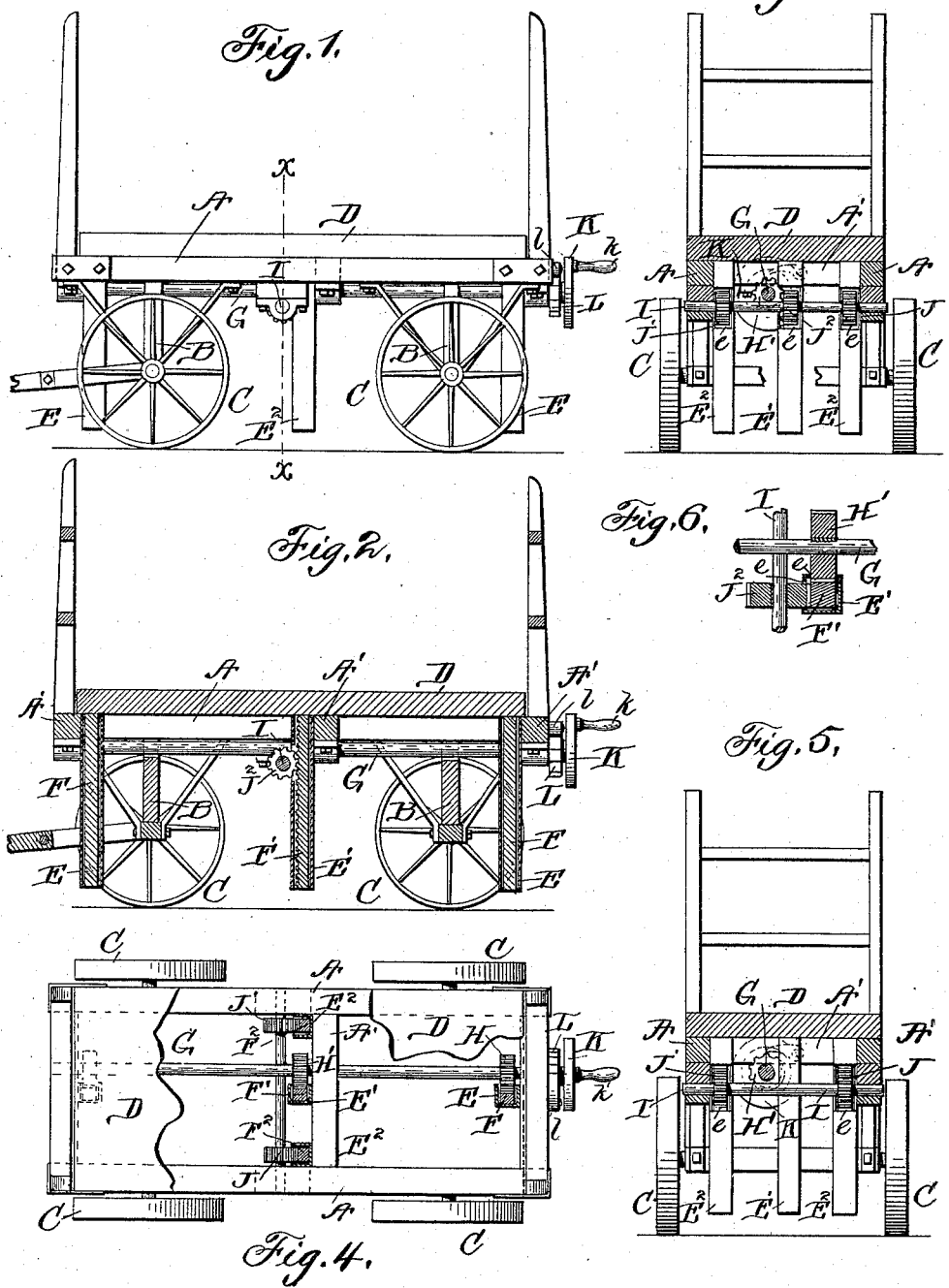

UNITED STATES PATENT OFFICE.

JOHN N. JEMISON, OF CHICAGO, ILLINOIS.

TRUCK.

SPECIFICATION forming part of Letters Patent No. 540,317, dated June 4, 1895.

Application filed September 14, 1894. Serial No. 523,019. (No model.)

*To all whom it may concern:*

Be it known that I, JOHN N. JEMISON, a citizen of the United States, residing at Chicago, in the county of Cook and State of Illinois, have invented certain new and useful Improvements in Trucks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in trucks, barrows and other vehicles adapted to be provided with a vertically adjustable floor or platform. The object is to provide a vehicle of this sort which shall be simpler than those heretofore constructed of this class, and which shall be more durable and easily operated.

Figure 1 is a side elevation showing my improvements embodied in a truck of the sort used for moving baggage and other articles on railroad-platforms. Fig. 2 is a longitudinal section. Fig. 3 is a cross-section on the line $xx$. Fig. 4 is a plan view of a modified form in which the center pinion on the cross-shaft is dispensed with. Fig. 5 is a vertical section showing the same. Fig. 6 is a detail sectional view showing the arrangement of operating-shafts and pinions for moving the central depending rack of the form of truck illustrated in Figs. 1 to 3.

In the drawings the main frame of the truck is shown as being more or less of the ordinary sort, it having main longitudinal sills or bars A A, with cross girts A', and downwardly extending standards B B, the whole being mounted upon the wheels C C and being adapted to be transported in the usual way. Upon the main frame thus provided I place the vertically movable floor or platform D. This may be a continuous floor, or it may be an open framework such as is sometimes employed.

From the stationary frame there extend down, and to it are secured, guides E, E at the ends, a similar guide E' at the center, and guides $E^2$, $E^2$ at the sides. These are preferably formed of tubing, angular in section, and are rigidly secured in position to the frame.

The platform D has toothed bars or racks which extend downwardly therefrom, and correspond to the tubular guides in which they are respectively fitted, they being indicated by F F, F', $F^2$ $F^2$. The tubular guides are respectively formed with openings at $e$ in their sides so as to expose some of the teeth in the racks.

G is a shaft mounted longitudinally of the main frame in suitable bearings secured thereto. It is provided with pinions H H H' respectively meshing with the racks F F F'.

I is a shaft mounted in the framework, transversely thereof, and having pinions J J' respectively meshing with the racks $F^2$ $F^2$. This shaft I is rotated by means of a pinion $J^2$ at its center which engages with the bar F', the latter having a supplemental rack $f$ on the side adjacent to this pinion $J^2$. When the shaft G is rotated, motion is transmitted to the cross shaft I in such way as to move the side rack bars F' F' upward. The shaft G extends through the frame and is provided with a crank wheel K having a handle $k$, by means of which power can be applied to the above described devices.

L is a locking ratchet wheel, and $l$ a pivoted pawl engaging therewith for the purpose of holding the shafts against backward rotation, and preventing the platform from descending until desired.

It will be seen that the platform is lifted uniformly over its whole area and is held balanced in such way as to avoid cramping or binding, the rising and descending being accomplished easily even if the load should be more or less away from the lines of balance.

In Figs. 4 and 5 I have shown a form of device somewhat modified, the center wheel $J^2$ on the cross shaft being dispensed with. In this case the cross shaft is rotated by the power received through the side racks and the pinions J J'. The shaft here acts to steady and brace the side parts of the platform and to cause them to move uniformly together up and down.

I am aware of the fact that it has been heretofore proposed to provide a truck with a movable platform, which is raised and lowered by means of three rack bars arranged to slide in guides in the central longitudinal vertical planes of the truck, there meshing with said rack bars, three pinions on a longitudinal shaft, for that purpose; and I do not claim such a device as of my invention. I provide a movable platform which is raised and lowered by means, which engage it at each side and end, so that an upward pressure is applied equally to all parts. When a heavy load is to be placed on the truck, such a construction as above described having three racks arranged in the same vertical plane, is practically useless, for unless the load is equally balanced, the rack bars will bend at points between the stationary frame and the platform, so that they cannot re-enter the guides; but in my construction in which the racks and guides are arranged at the sides, supplemental to those in the central vertical longitudinal plane of the truck, the load is supported at the sides, and there is no tendency for it to tilt.

What I claim is—

1. The combination with the truck body, of the vertically adjustable platform, the rack bars secured thereto, the tubular guides secured to the truck frame for the rack bars, the power shaft having pinions engaging with two or more of said rack bars, and the cross shaft engaging with one or more of said rack bars and receiving motion from one of the rack bars actuated by the power shaft, substantially as set forth.

2. The combination with the truck frame having mounted thereon a power shaft provided with pinions H H H', and the transverse shaft I provided with the pinions J J', of the vertically adjustable platform having the rack bars secured rigidly thereto and extending downward in lines to engage with said pinions, and the pinion J² on the transverse shaft also engaging with one of the rack bars, substantially as set forth.

3. A truck having the main wheel frame provided with a guide at each end, the guides at each side and a guide at the center, of the adjustable platform having the downwardly extending rack bars at the ends, the rack bars at the sides, and the center rack bar, of the two transversely arranged shafts in different planes, one having pinions engaging with the end bars, the other having pinions engaging with the side bars, and each having a pinion engaging with the central bar, substantially as set forth.

4. In a truck or similar wheeled vehicle, the combination with the main frame, of the vertically adjustable platform having the downwardly extended racks, the longitudinal shaft on the bed geared to two or more of said racks, and the transverse shaft geared to racks supplemental to those aforesaid, substantially as set forth.

5. In a truck or similar vehicle, the combination with the main frame, of the vertically adjustable platform, the rack bars secured thereto and extending downward, the transverse shaft geared to two or more of said racks, the longitudinal shaft geared to racks supplemental to those aforesaid, and means for locking the said shaft against backward rotation, substantially as set forth.

6. The combination with the truck body having depending guides, the movable platform having depending racks sliding in said guides, said racks and guides being arranged in the central vertical longitudinal planes of the truck, and the shaft and pinions for moving said racks, of the depending guides at the sides of the truck body, and the depending supports for the movable platform sliding in said guides, all of said guides, said racks and said supports being depending whereby a free space is left above the platform for the depositing of baggage upon said platform, substantially as set forth.

7. The combination of the truck body, the movable platform, the guides arranged at the ends of said truck body, the guides arranged at the sides of said truck body, the racks in said guides, the transverse shaft having pinions for actuating the rack bars at the sides, the longitudinally arranged shaft driving the aforesaid shaft and having pinions for actuating the rack bars at the ends, and a hand wheel mounted upon the end of the longitudinal shaft, substantially as set forth.

In testimony whereof I affix my signature in presence of two witnesses.

JOHN N. JEMISON.

Witnesses:
G. W. UPDIKE,
O. L. SPALDING.